US008996488B2

(12) United States Patent
Asher et al.

(10) Patent No.: US 8,996,488 B2
(45) Date of Patent: Mar. 31, 2015

(54) METHODS, SYSTEMS AND COMPUTER PROGRAM PRODUCTS FOR OBTAINING GEOGRAPHICAL COORDINATES FROM A TEXTUALLY IDENTIFIED LOCATION

(75) Inventors: Michael Asher, Green Cove Sp, FL (US); Christopher Giles, Alabaster, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1028 days.

(21) Appl. No.: 12/337,048

(22) Filed: Dec. 17, 2008

(65) Prior Publication Data

US 2010/0153418 A1 Jun. 17, 2010

(51) Int. Cl.
*G06F 7/00* (2006.01)
*G06F 17/30* (2006.01)

(52) U.S. Cl.
CPC .............................. *G06F 17/30241* (2013.01)
USPC .......................................... 707/705; 707/729

(58) Field of Classification Search
CPC .......... G06F 17/3087; G06F 17/30864; G06F 17/30929; G06F 17/30241
USPC ........................ 707/705, 723, 724, 728, 729
See application file for complete search history.

(56) References Cited

U.S. PATENT DOCUMENTS

| 7,747,598 | B2 * | 6/2010 | Buron et al. ................... 707/705 |
| 7,822,763 | B2 * | 10/2010 | Sauls et al. ..................... 707/766 |
| 2006/0111896 | A1 * | 5/2006 | Menezes et al. ................. 704/10 |
| 2009/0094270 | A1 * | 4/2009 | Alirez et al. ................... 707/102 |
| 2010/0153366 | A1 * | 6/2010 | Liu .............................. 707/722 |

* cited by examiner

*Primary Examiner* — Md. I Uddin
(74) *Attorney, Agent, or Firm* — Myers Bigel Sibley & Sajovec

(57) ABSTRACT

A rule-based system for improving accuracy of geocoding results is provided including a communications device configured to transmit a query including a textually identified location and a geocoding accuracy module configured to receive the query from the communications device and successively remove constraints from the textually identified location until a match is located. Related methods and computer program products are also provided.

9 Claims, 5 Drawing Sheets

METHODS, SYSTEMS AND COMPUTER PROGRAM PRODUCTS FOR OBTAINING GEOGRAPHICAL COORDINATES FROM A TEXTUALLY IDENTIFIED LOCATION

BACKGROUND

The present application relates generally to geocoding, and, more particularly to methods, systems and computer program products for accurately locating geographical coordinates based on a textually identified location.

Many conventional geographic information systems (GISs) rely upon the process of geocoding, which is the translation of a textually identified location into a pair of geographical coordinates. The textually identified location may be, for example, a physical street address, and the geographic coordinates may be, for example, a longitude/latitude pair.

The source of the textually identified location is typically a human source and, thus, the GIS must typically have the capacity to deal with human error. For example, many streets are known by different names or differing variations of the same name. The street name may be misspelled, portions of the street name may be omitted, directional tags may be misplaced or omitted, for example, "Elm St East" may be called "East Elm St", or simply "Elm St", and/or the thoroughfare type, such as "street", "road", "avenue", "court", and the like, may be incorrect or not provided.

Conventional applications which need to geocode potentially incorrect street addresses typically perform an exact search, possibly followed by a second, expanded search that may omit the need for all portions of the address to match exactly. In an urban setting, the second search quite often finds numerous matches, any one of which can be the correct street. This may result in additional, unnecessary geocoding errors.

SUMMARY

Some embodiments provide a rule-based system for improving accuracy of geocoding results including a communications device configured to transmit a query including a textually identified location and a geocoding accuracy module configured to receive the query from the communications device and successively remove constraints from the textually identified location until a match is located.

In further embodiments, the geocoding accuracy module may be further configured to locate corresponding geographic coordinates for the matched textually identified location.

In still further embodiments, the rule-based system may provide at least about a 5.0 percent increase in the accuracy of the geocoding results.

In some embodiments, the geocoding accuracy module may be further configured to attempt to obtain an exact match for the queried textually identified location; then modify the textually identified location by swapping pre and post directionals, if present, to obtain a modified version of the textually identified location if an exact match cannot be obtained and attempt to obtain a match for the modified textually identified location; and then modify the textually identified location by adding directionals if no directionals are given if no match has been obtained and attempt to obtain a match for the modified textually identified location.

In further embodiments, the geocoding accuracy module may be further configured to modify the textually identified location by adding a thoroughfare type if a thoroughfare type is not already specified in the textually identified location if no match has been obtained and attempt to obtain a match for the modified textually identified location; then attempt to obtain a match for the textually identified location wherein generic thoroughfare type indicators are presumed to match specific thoroughfare type indicators to obtain the match; and then attempt to obtain a match for the textually identified location wherein directionals are allowed to deviate by up to about 45 degrees to obtain the match.

In still further embodiments, the geocoding accuracy module may be further configured to attempt to obtain a match for the textually identified location wherein double letter and whitespace expansion checking is enabled to obtain the match; then attempt to obtain a match for the textually identified location wherein common phoneme substitution is enabled to obtain the match; and then attempt to obtain a match for the textually identified location wherein common street suffix/prefix insertion is enabled to obtain the match.

In some embodiments, the geocoding accuracy module may be further configured to attempt to obtain a match for the textually identified location wherein thoroughfare type checking is disabled completely to obtain the match; then attempt to obtain a match for the textually identified location wherein directional checking is disabled completely to obtain the match; and then convert the textually identified location to soundex form, allowing for phonetic-style name matching and a wide variance in the actual spelling of street names, to obtain a converted textually identified location and repeat all rules using the converted textually identified location until a match is obtained.

In further embodiments, the textually identified location includes a street address or a postal code and wherein the geographic coordinates include a latitude/longitude pair.

Although embodiments are discussed primarily above with respect to systems, related methods and computer program products are also provided.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
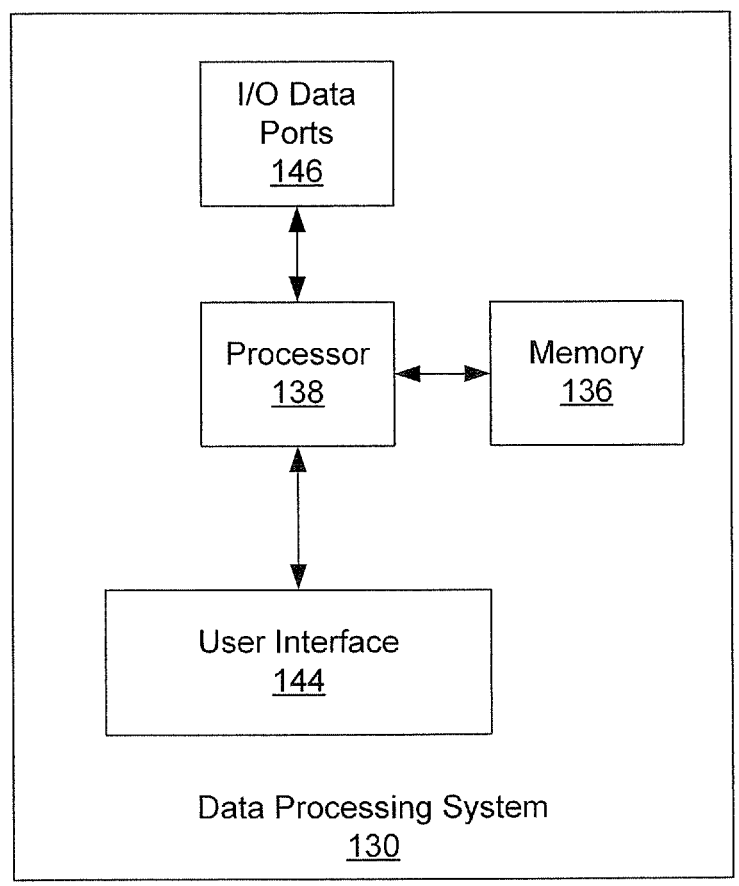
FIG. 1 is a block diagram of a data processing system suitable for use in some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated Some embodiments discuss geocoding. As used herein, "geocoding" refers to the process of translating a textually identified location into a pair of geographic coordinates. With geographic coordinates the features can be mapped and entered into geographic information systems (GISs), or the coordinates can be embedded into media, such as digital photographs via geotagging. It will be understood that some embodiments may also include reverse geocoding, which is the opposite of geocoding, i.e., finding an associated textual-location, such as a street address, from geographic coordinates, without departing from the embodiments discussed herein.

As discussed above, many conventional GISs rely upon the process of geocoding, which is the translation of a textually identified location into a pair of geographical coordinates. As used herein, the "textually identified location" may be any type of textual location information, for example, a physical street address, a zip or postal code or the like. As used herein, "geographic coordinates" may be any type of geographical coordinates that represent the textually identified location, for example, a longitude/latitude pair.

Since the source of the textually identified location is typically a human, the GIS must have the capacity to deal with human error. For example, many streets are known by different names or differing variations of the same name. The street name may be misspelled, portions of the street name may be omitted, directional tags may be misplaced or omitted, for example, "Elm St East" may be called "East Elm St", or simply "Elm St", and/or the thoroughfare type, such as "street", "road", avenue", "court", and the like, may be incorrect or not provided at all.

Conventional applications which need to geocode potentially incorrect street addresses typically perform an exact search of the textually identified location, possibly followed by a second, expanded search of the textually identified location that may omit the need for all portions of the address to match exactly. In some settings, for example, an urban setting, the second expanded search may find numerous matches for the textually identified location, any one of which can be the correct street. This may result in additional, unnecessary geocoding errors.

Accordingly, some embodiments provide rule-based methods, systems and computer program products for improving accuracy of geocoding based upon a multi-step process that successively relaxes query parameters. Some embodiments discuss an ordering of the steps in the process that is based on a statistical determination of the most common human error types in specifying street names, in conjunction with the likelihood of each error introducing false matches.

Some embodiments of the methods, systems and computer program products discussed herein have resulted in at least about a 5.0% increase in geocoding accuracy. While this value may seem small, in a large-scale application, this increase can translate to tens of thousands fewer errors. For a telecommunications provider, the potential cost of even a single geocoding error can result in physical cable damage running to the millions of dollars. Therefore, even incremental increases in geocoding accuracy can yield huge cost benefits. The details of some embodiments will be discussed herein with respect to FIGS. 1 through 5.

Referring first to FIG. 1, a data processing system 130 in accordance with some embodiments will be discussed. The data processing system 130 may be included in a geocoding server to perform the rule-based system for improving the accuracy of textually identified location geocoding requests in accordance with some embodiments. As illustrated in FIG. 1, the data processing system 130 may include a user interface 144, including, for example, input device(s) such as a keyboard or keypad, a display, a speaker and/or microphone, and a memory 136 that communicate with a processor 138. The data processing system 130 may further include I/O data port(s) 146 that also communicates with the processor 138. The I/O data ports 146 can be used to transfer information between the data processing system 130 and another computer system or a network, such as the geocoding server, using, for example, an Internet Protocol (IP) connection. These components may be conventional components such as those used in many conventional data processing systems, which may be configured to operate as described herein.

Figure 2:
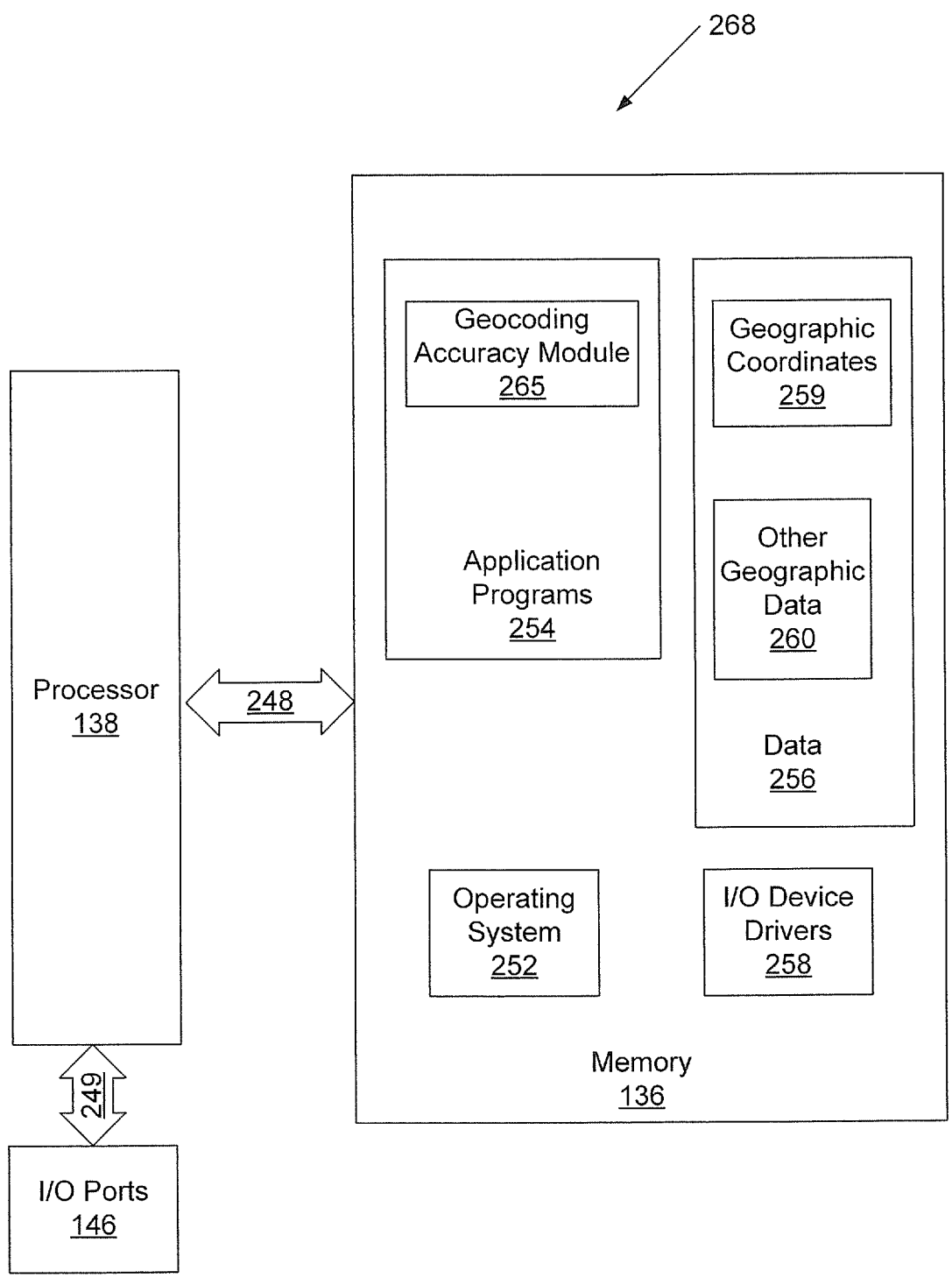
FIG. 2 is a more detailed block diagram of a system according to some embodiments.

Referring now to FIG. 2, a more detailed block diagram of a data processing system 268 for implementing systems, methods, and computer program products in accordance with some embodiments will now be discussed. It will be understood that the application programs and data discussed with respect to FIG. 2 below may be present in, for example, a geocoding server without departing from the scope of embodiments discussed herein.

As illustrated in FIG. 2, the processor 138 communicates with the memory 136 via an address/data bus 248. The processor 138 can be any commercially available or custom enterprise, application, personal, pervasive and/or embedded microprocessor, microcontroller, digital signal processor or the like. The memory 136 may include any memory device containing the software and data used to implement the functionality of the data processing system 130. The memory 136 can include, but is not limited to, the following types of devices: ROM, PROM, EPROM, EEPROM, flash memory, SRAM, and DRAM.

As further illustrated in FIG. 2, the memory 136 may include several categories of software and data used in the system 268: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000 or WindowsXP, or Windows CE from Microsoft Corporation, Redmond, Wash., Palm OS, Symbian OS, Cisco IOS, VxWorks, Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the system 268 and may include at least one application that supports operations according to embodiments. Finally, as illustrated, the data 256 may include geographic coordinate data 259 and other geographic data 260, which may represent the static and dynamic data used by the application programs 254, the operating system 252, the I/O device drivers 258, and other software programs that may reside in the memory 136.

As further illustrated in FIG. 2, according to some embodiments, the application programs 254 include a geocoding accuracy module 265. While the present invention is illustrated with reference to the geocoding accuracy module 265 being an application program in FIG. 2, as will be appreciated by those of skill in the art, other configurations fall within the scope of embodiments discussed herein. For example, rather than being an application program 254, this circuit or module may also be incorporated into the operating system 252 or other such logical division of the system 268. Furthermore, while the geocoding accuracy module 265 is illustrated in a single system 268, as will be appreciated by those of skill in the art, such functionality may be distributed across one or more systems. Thus, the present invention should not be construed as limited to the configuration illustrated in FIG. 2, but may be provided by other arrangements and/or divisions of functions between data processing systems. For example, although FIG. 2 is illustrated as having various circuits, one or more of these circuits may be combined without departing from the scope of embodiments discussed herein.

The geocoding accuracy module 265 is configured to implement a rule-based system for improving accuracy of geocoding results according to some embodiments. In particular, the geocoding accuracy module 265 may be configured to receive configured to receive a query including a textually identified location from a communications device and successively remove constraints from the textually identified location until a match is located. Once a match is obtained, the geocoding accuracy module 265 may be further configured to locate corresponding geographic coordinates for the matched textually identified location. Use of the rule-based system in accordance with some embodiments may provide at least about a 5.0 percent increase in the accuracy of the geocoding results.

The rule-based system for improving the accuracy of geocoding results in accordance with some embodiments may be based on a multi-step process by which constraints on the address query are successively removed until a match is found. In some embodiments, the ordering of the steps may be based on a statistical sampling performed of the probability of various types of human errors made when specifying a textually identified location, for example, a street addresses, weighted by the probability that a given relaxation will introduce a false match.

Figure 3:
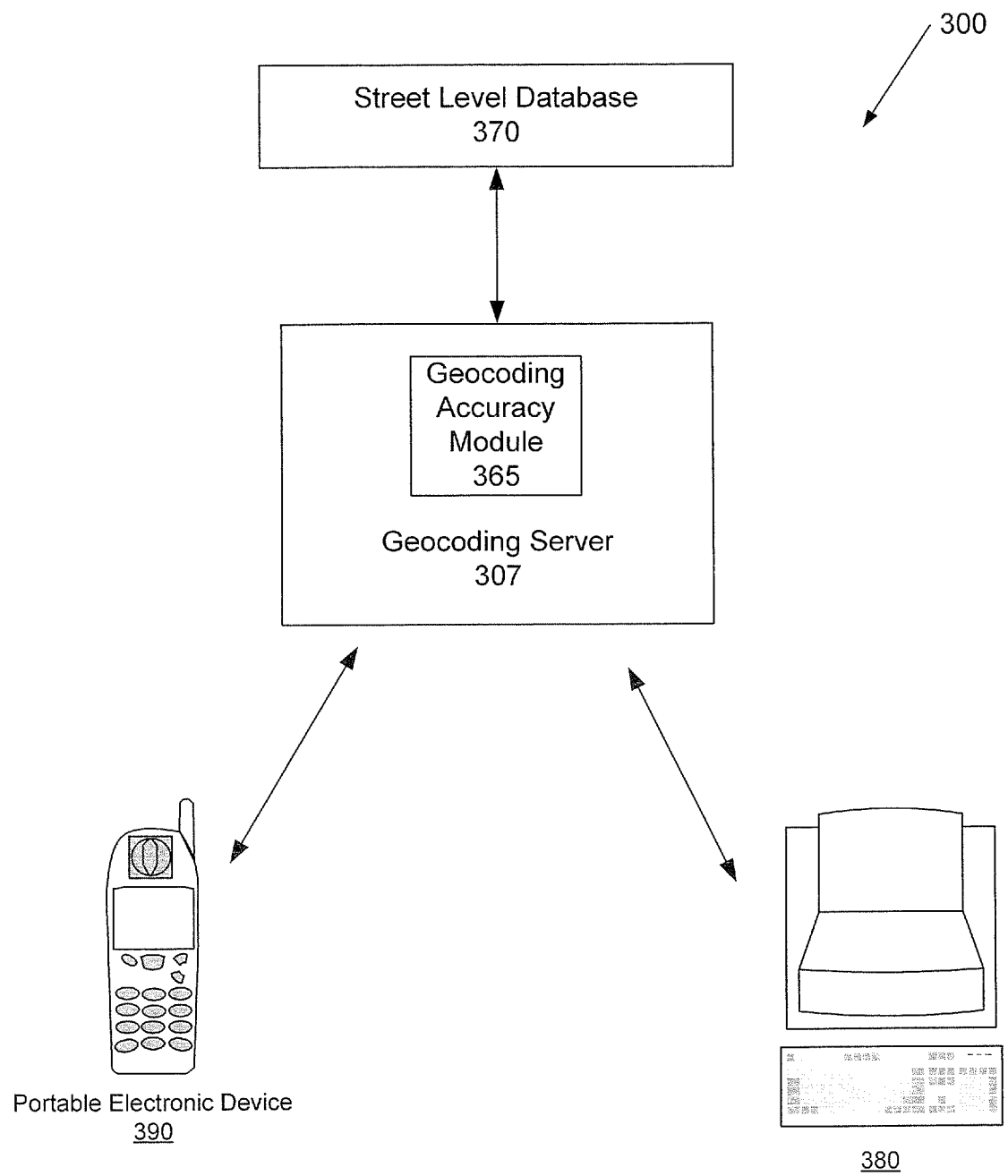
FIG. 3 is a block diagram illustrating a system in which devices access the geocoding server according to some embodiments.

Referring now to FIG. 3, a system 300 in accordance with some embodiments will be discussed. As illustrated in FIG. 3, the system 300 may include a geocoding server 307 including the geocoding accuracy module 365, at least one communications device, such as portable electronic device 390 and desktop computer 380 and a Street Level Database 370. It will be understood that the geocoding server 307 may include the entire data processing system 268 discussed with respect to FIG. 2. The geocoding server 307 may communicate with, for example, a Street Level Database 370, to obtain geographic coordinates for a textually identified location.

The communications device 380 and 390 can be any type of communications device capable of communicating with the geocoding server 307 over a wired or wireless connection. Although only two communication devices are illustrated in FIG. 3, embodiments are not limited to this configuration. For example, one or more than two communication devices may be present without departing from the scope of embodiments discussed herein.

If the communications device is a portable electronic device 390, as used herein "portable electronic device" includes: a cellular radiotelephone with or without a multi-line display; a Personal Communications System (PCS) terminal that combines a cellular radiotelephone with data processing, facsimile and data communications capabilities; a Personal Data Assistant (PDA) that includes a radiotelephone, pager, Internet/intranet access, Web browser, organizer, calendar and/or a global positioning system (GPS) receiver; a gaming device, an audio video player, and a conventional laptop and/or palmtop portable computer that includes a radiotelephone transceiver.

Exemplary embodiments will now be discussed with respect to FIG. 3. Although a specific order is discussed with respect to the removal of the constraints from the query, embodiments are not limited to this configuration. A different order of removal may also result in increased accuracy of geocoding results.

Referring now to FIG. 3, a query including a textually identified location, such as a street address or a zip code, is transmitted from a communications device 380 and 390 to the geocoding server 307. The query is received by the geocoding accuracy module 365 and the geocoding accuracy module 365 attempts to locate an exact match for the queried textually identified location. As used herein, "exact match" refers to the entirety of the textually identified location except the thoroughfare type, for example, street, avenue, court, place and the like. For example, "Chandler St." would be an exact match for "Chandler Street" even though Street is abbreviated in the first instance.

If an exact match is not found, positions of pre-directionals and post directionals, if present in the textually identified location, are allowed to be swapped and/or abbreviated. For example, "Northwest Chandler St." matches "Chandler St. NW," but neither matches simply "Chandler St." nor "Chandler SW." If no directional is given, directionals may be added to the textually identified location and these variants including directionals may be used to try to obtain a match. For example, "Chandler" would match "North Chandler."

If no match is obtained and a thoroughfare type is not specified, matches for all types of thoroughfares are allowed, for example, "Chandler" would match "Chandler St.", "Chandler Rd." and the like. If no match is obtained, generic thoroughfare type indicators are allowed to match specific types. For example, "Chandler St." would match "Chandler Road" or "Chandler Avenue", but "Chandler Avenue" would not match "Chandler Street" or "Chandler Court."

If no match is obtained, directionals that may be present in the textually identified location are allowed to deviate up to 45 degrees. For example, "Chandler N" would match "Chandler NW" or "Chandler NE." If no match is obtained, double-letter and whitespace expansion checking is enabled. For example, "Channdler St." would match "Chandler St." and "Van-Damme Rd" would match "Van Damme Rd."

If no match is obtained, common phoneme substitution is enabled. For example, "Westy Blvd" would match "Westie Blvd." If no match is obtained, common street suffix/prefix insertion is enabled, for example, "Chandler Rd" would match "Old Chandler Rd" and "New Chandler Rd."

If no match is obtained, thoroughfare type checking is disabled completely, for example, "Chandler Blvd" would match "Chandler St.", "Chandler Ct.", and "Chandler Ave." If no match is obtained, directional checking is disabled completely, for example, "Chandler South" would match "Chandler North" and "West Chandler."

If no match is obtained, the queried textually identified location is converted to "soundex" form, allowing for phonetic-style name matching and an extremely wide variance in the actual spelling of street names. Then, all of the steps discussed above are repeated with the soundex version of the textually identified location until a match is obtained.

Once a match is obtained, the geographical coordinates, for example, longitude/latitude, associated with the matched textually identified location may be obtained.

It will be understood that in some embodiments, it is assumed that the database being queried already contains synonym forms for given street names. For instance, "Chandler Blvd" may also be known as "Hwy 195" during all or parts of its length.

Figure 4:
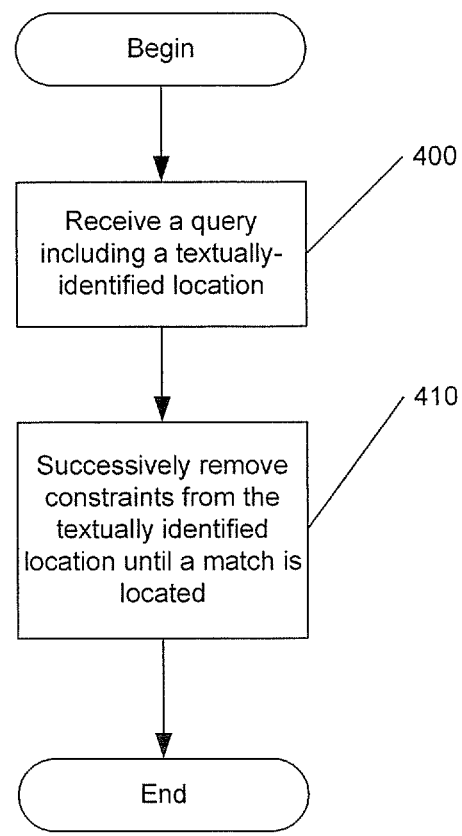
FIGS. 4 and 5 are flowcharts illustrating operations according to various embodiments.

Operations in accordance with various embodiments will now be discussed with respect to FIGS. 4 and 5. Referring first to FIG. 4, operations for improving accuracy of geocoding results begin at block 400 by receiving a query including a textually identified location. If an exact match for the textually identified location cannot be found, constraints are successively removed from the textually identified location until a match is located (block 410).

Figure 5:
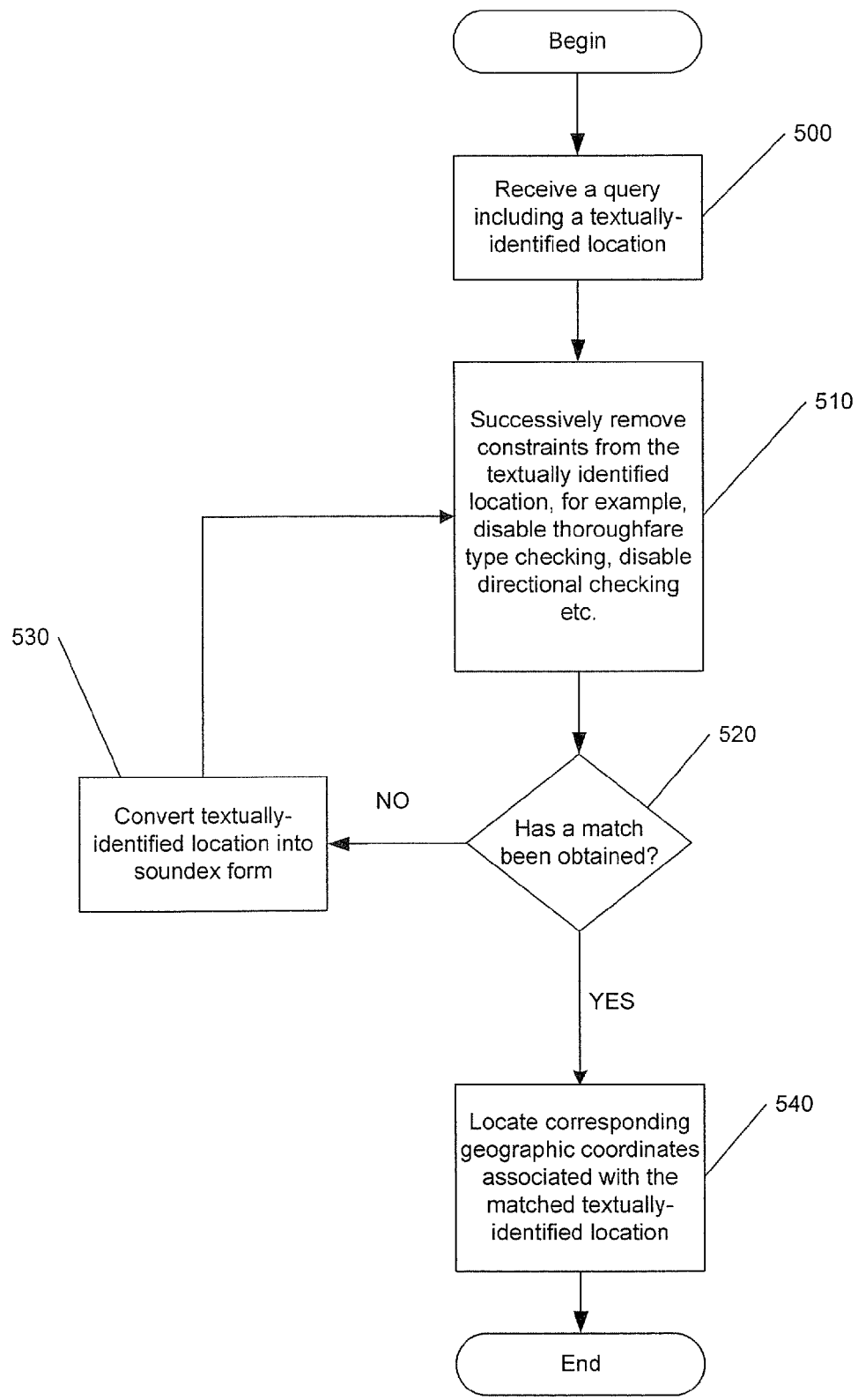

Referring now to FIG. 5, operations for improving accuracy of geocoding result begin at block 500 by receiving a query including a textually identified location. If an exact match for the textually identified location cannot be found, constraints are successively removed from the textually identified location until a match is located (block 510). A series of rules may be followed to successively remove constraints from the queried textually identified location. As discussed above, the order of the rules discussed herein does not limit embodiments.

In particular, an attempt is made to locate an exact match for the queried textually identified location. As used herein, "exact match" refers to the entirety of the textually identified location except the thoroughfare type, for example, street, avenue, court, place and the like. For example, "Chandler St." would be an exact match for "Chandler Street" even though Street is abbreviated in the first instance.

If an exact match is not found, positions of pre-directionals and post directionals, if present in the textually identified location, are allowed to be swapped and/or abbreviated. For example, "Northwest Chandler St." matches "Chandler St. NW," but neither matches simply "Chandler St." nor "Chandler SW." If no directional is given, directionals may be added to the textually identified location and these variants including directionals may be used to try to obtain a match. For example, "Chandler" would match "North Chandler."

If no match is obtained and a thoroughfare type is not specified, matches for all types of thoroughfares are allowed, for example, "Chandler" would match "Chandler St.", "Chandler Rd." and the like. If no match is obtained, generic thoroughfare type indicators are allowed to match specific types. For example, "Chandler St." would match "Chandler Road" or "Chandler Avenue", but "Chandler Avenue" would not match "Chandler Street" or "Chandler Court."

If no match is obtained, directionals that may be present in the textually identified location are allowed to deviate up to 45 degrees. For example, "Chandler N" would match "Chandler NW" or "Chandler NE." If no match is obtained, double-letter and whitespace expansion checking is enabled. For example, "Channdler St." would match "Chandler St." and "Van-Damme Rd" would match "Van Damme Rd."

If no match is obtained, common phoneme substitution is enabled. For example, "Westy Blvd" would match "Westie Blvd." If no match is obtained, common street suffix/prefix insertion is enabled, for example, "Chandler Rd" would match "Old Chandler Rd" and "New Chandler Rd."

If no match is obtained, thoroughfare type checking is disabled completely, for example, "Chandler Blvd" would match "Chandler St.", "Chandler Ct.", and "Chandler Ave." If no match is obtained, directional checking is disabled completely, for example, "Chandler South" would match "Chandler North" and "West Chandler."

It is determined if a match has been obtained (block 520). If it is determined that a match has been obtained after all the rules have been exhausted (block 510), the geographical coordinates, for example, longitude/latitude, associated with the matched textually identified location may be obtained (block 540).

If, on the other hand, it is determined that a match has not be obtained (block 520), the queried textually identified location is converted to "soundex" form (block 530) to obtain a converted textually identified location. Then, the rules discussed above with respect to block 510 are repeated with the converted textually identified location until a match is obtained.

As discussed above, some embodiments provide systems, methods and computer program products for improving the accuracy of geocoding results. Some embodiments provide at least about a 5.0 percent increase in the accuracy of the geocoding results. This result was obtained using real-world testing of street addresses input from Public Utility Onecall Centers. While 5.0 percent may, in the abstract, appear small, in a large-scale application, this increase can mean tens of thousands fewer errors. For telecommunications providers, the potential cost of even a single geocoding error can result in physical cable damage running to the millions of dollars. Therefore, even incremental increases in geocoding accuracy can yield huge cost benefits.

Many variations and modifications can be made to the embodiments discussed herein without substantially departing from the principles of the present invention. All such variations and modifications are intended to be included herein within the scope of the present invention, as set forth in the following claims.

That which is claimed:

1. A rule-based system for improving accuracy of geocoding results, the system comprising:
   a processor, the processor including:
   a geocoding accuracy module for receiving a query including a textually identified location from a communications device and successively removing constraints from the textually identified location until a match is located, wherein the geocoding accuracy module performs operations as follows:
   first, determines if there is an exact match for the queried textually identified location; then
   second, modifies the textually identified location by swapping pre and post directionals, if present, to obtain a modified version of the textually identified location if an exact match cannot be obtained and determines if there is a match for the modified version of the textually identified location; and then
   third, modifies the textually identified location by adding directionals if no directionals are given and if no match has been obtained and determines if there is a match for the modified textually identified location,
   wherein swapping pre and post directionals, if present, comprises moving a directional that is currently in front of the textually identified location to an end of the textually identified location to provide a swapped front to back directional and moving a directional that is currently at the end of the textually identified location to the front of the textually identified location to provide a swapped back to front directional;
   wherein the swapped front to back directional and the swapped back to front directional indicate a same direction before and after a swap; and
   wherein the geocoding accuracy module performs operations as follows in sequence after modifying the textually identified location by adding directionals:
   modifies the textually identified location by adding a thoroughfare type if a thoroughfare type is not already specified in the textually identified location if no match has been obtained and determines if there is a match for the modified textually identified location; then
   determines if there is a match for the textually identified location wherein generic thoroughfare type indicators are presumed to match specific thoroughfare type indicators to obtain the match; then
   determines if there is a match for the textually identified location wherein directionals are allowed to deviate by up to 45 degrees to obtain the match; then
   determines if there is a match for the textually identified location wherein double letter and whitespace expansion checking is enabled to obtain the match; then
   determines if there is a match for the textually identified location wherein common phoneme substitution is enabled to obtain the match; then determines if there is a match for the textually identified location wherein common street suffix/prefix insertion is enabled to obtain the match; then determines if there is a match for the textually identified location wherein thoroughfare type checking is disabled completely to obtain the match; then determines if there is a match for the textually identified location wherein directional checking is disabled completely to obtain the match; and then converts the textually identified location to soundex form, allowing for phonetic-style name matching and a wide variance in the actual spelling of street names, to obtain a converted textually identified location and repeat all rules using the converted textually identified location until a match is obtained.

2. The system of claim 1, wherein the geocoding accuracy module is further locates corresponding geographic coordinates for the modified version of the textually identified location.

3. The system of claim 1, wherein the rule-based system provides at least a 5.0 percent increase in accuracy of geocoding results.

4. The system of claim 1, wherein the textually identified location comprises a street address or a postal code and wherein the geographic coordinates comprise a latitude and longitude pair.

5. A method for improving accuracy of geocoding results, comprising:

receiving, from a communications device, a query including a textually identified location at a geocoding accuracy module; and successively removing constraints from the textually identified location at the geocoding accuracy server until a match is located, wherein successively removing constraints comprises:

first, determining if there is an exact match for the queried textually identified location; then second, modifying the textually identified location by swapping pre and post directionals, if present, to obtain a modified version of the textually identified location if an exact match cannot be obtained and determining if there is a match for the modified textually identified location; and then third, modifying the textually identified location by adding directionals if no directionals are given and if no match has been obtained and determining if there is a match for the modified textually identified location, wherein swapping pre and post directionals, if present, comprises moving a directional that is currently in front of the textually identified location to an end of the textually identified location to provide a swapped front to back directional and moving a directional that is currently at the end of the textually identified location to the front of the textually identified location to provide a swapped back to front directional;

wherein the swapped front to back directional and the swapped back to front directional indicate a same direction before and after a swap; and wherein modifying the textually identified location by adding directionals is followed in sequence by:

modifying the textually identified location by adding a thoroughfare type if a thoroughfare type is not already specified in the textually identified location if no match has been obtained and determining if there is a match for the modified textually identified location; then determining if there is a match for the textually identified location wherein generic thoroughfare type indicators are presumed to match specific thoroughfare type indicators to obtain the match; then determining if there is a match for the textually identified location wherein directionals are allowed to deviate by up to 45 degrees to obtain the match; then determining if there is a match for the textually identified location wherein double letter and whitespace expansion checking is enabled to obtain the match; then determining if there is a match for the textually identified location wherein common phoneme substitution is enabled to obtain the match; then determining if there is a match for the textually identified location wherein common street suffix and prefix insertion is enabled to obtain the match; then determining if there is a match for the textually identified location wherein thoroughfare type checking is disabled completely to obtain the match; then determining if there is a match for the textually identified location wherein directional checking is disabled completely to obtain the match; and then converting the textually identified location to soundex form, allowing for phonetic-style name matching and a wide variance in the actual spelling of street names, to obtain a converted textually identified location and repeating all rules using the converted textually identified location until a match is obtained.

6. The method of claim 5, further comprising locating corresponding geographic coordinates for the modified version of the textually identified location.

7. The method of claim 5, wherein the method provides at least a 5.0 percent increase in accuracy of geocoding results.

8. A computer program product for improving accuracy of geocoding results, the computer program product comprising:

a non-transitory computer-readable storage medium having computer-readable program code embodied in said medium, said computer-readable program code comprising:

computer readable program code for receiving, from a communications device, a query including a textually identified location at a geocoding accuracy module; and computer readable program code for successively removing constraints from the textually identified location at the geocoding accuracy server until a match is located, wherein the computer readable program code for successively removing constraints comprises the following performed in sequence:

computer readable program code for first determining if there is an exact match for the queried textually identified location;

computer readable program code for next modifying the textually identified location by swapping pre and post directionals, if present, to obtain a modified version of the textually identified location if an exact match cannot be obtained and determining if there is a match for the modified textually identified location;

computer readable program code for next modifying the textually identified location by adding directionals if no directionals are given and if no match has been obtained and determining if there is a match for the modified textually identified location, computer readable program code for locating corresponding geographic coordinates for the modified version of the textually identified location, wherein swapping pre and post directionals, if present, comprises at least one of moving a directional that is currently in front of the textually identified location to an end of the textually identified location to provide a swapped front to back directional and moving a directional that is currently at the end of the textually identified location to the front of the textually identified location to provide a swapped back to front directional;

wherein the swapped front to back directional and the swapped back to front directional indicate a same direction before and after a swap; and wherein the computer readable program code for successively removing constraints further comprises the following performed in sequence after the computer readable program code for modifying the textually identified location by adding directionals:

computer readable program code for modifying the textually identified location by adding a thoroughfare type if a thoroughfare type is not already specified in the textually identified location if no match has been obtained and determining if there is a match for the modified textually identified location;

computer readable program code for determining if there is a match for the textually identified location wherein generic thoroughfare type indicators are presumed to match specific thoroughfare type indicators to obtain the match;

computer readable program code for determining if there is a match for the textually identified location wherein directionals are allowed to deviate by up to 45 degrees to obtain the match;

computer readable program code for determining if there is a match for the textually identified location wherein double letter and whitespace expansion checking is enabled to obtain the match;

computer readable program code for determining if there is a match for the textually identified location wherein common phoneme substitution is enabled to obtain the match;

computer readable program code for determining if there is a match for the textually identified location wherein common street suffix and prefix insertion is enabled to obtain the match;

computer readable program code for determining if there is a match for the textually identified location wherein thoroughfare type checking is disabled completely to obtain the match;

computer readable program code for determining if there is a match for the textually identified location wherein directional checking is disabled completely to obtain the match; and computer readable program code for converting the textually identified location to soundex form, allowing for phonetic-style name matching and a wide variance in the actual spelling of street names, to obtain a converted textually identified location and repeat all rules using the converted textually identified location until a match is obtained.

9. The computer program product of claim 8, wherein the computer program product provides at least a 5.0 percent increase in accuracy of geocoding results.

\* \* \* \* \*